United States Patent
Camp

[19]

[11] Patent Number: 6,011,323
[45] Date of Patent: Jan. 4, 2000

[54] APPARATUS, METHOD AND ARTICLE OF MANUFACTURE PROVIDING FOR AUXILIARY BATTERY CONSERVATION IN ADAPTERS

[75] Inventor: William O. Camp, Chapel Hill, N.C.

[73] Assignee: International Business Machines Corporation, Armonk, N.Y.

[21] Appl. No.: 08/941,814

[22] Filed: Sep. 30, 1997

[51] Int. Cl.⁷ ..................................................... H02J 9/06
[52] U.S. Cl. ................................. 307/64; 307/44; 307/66; 307/126; 364/707; 395/750.03; 455/117
[58] Field of Search ..................................... 307/126, 125, 307/64, 66, 44; 340/825.06; 455/95, 115, 127, 343, 117; 365/226; 364/492, 707; 395/182.12, 750.03

[56] References Cited

U.S. PATENT DOCUMENTS

| | | | |
|---|---|---|---|
| 4,636,741 | 1/1987 | Mitzlaff | 330/127 |
| 5,170,070 | 12/1992 | Hattori et al. | 307/43 |
| 5,408,520 | 4/1995 | Clark et al. | 379/93 |
| 5,422,931 | 6/1995 | Austin-Lazarus et al. | 379/69 |
| 5,442,512 | 8/1995 | Bradbury | 361/683 |
| 5,451,933 | 9/1995 | Stricklin et al. | 340/825.06 |
| 5,463,261 | 10/1995 | Skarda et al. | 307/131 |
| 5,469,442 | 11/1995 | Seligmann et al. | 370/110.4 |
| 5,490,117 | 2/1996 | Oda et al. | 365/226 |
| 5,512,886 | 4/1996 | Macko et al. | 340/825.07 |
| 5,528,248 | 6/1996 | Steiner et al. | 342/357 |
| 5,650,669 | 7/1997 | Aldous | 455/95 |
| 5,678,229 | 10/1997 | Seki et al. | 455/343 |
| 5,739,597 | 4/1998 | Bailey et al. | 307/66 |
| 5,835,366 | 11/1998 | Pleso et al. | 307/66 |
| 5,925,942 | 7/1999 | Theobald | 307/66 |

FOREIGN PATENT DOCUMENTS

| | | | |
|---|---|---|---|
| 2289555 | 11/1995 | United Kingdom | G06F 3/00 |

*Primary Examiner*—Albert W. Paladini
*Attorney, Agent, or Firm*—John D. Flynn; Winstead Sechrest & Minick PC

[57] ABSTRACT

An apparatus, method and article of manufacture are disclosed which provides for auxiliary battery conservation in adapters requiring auxiliary batteries. A power controller selects from one of two or more power sources to provide variable power components with DC power. For instance, power consumption of the transmitter (more specifically the transmit power amplifier) varies with the desired transmit power level. The transmitter can be supplied with DC power from the host device or the auxiliary source or both. The power controller can select the source of DC power (i.e., the host device or the auxiliary battery) or may combine the two power sources to provide necessary power to the transmit power amplifier.

14 Claims, 7 Drawing Sheets

APPARATUS, METHOD AND ARTICLE OF MANUFACTURE PROVIDING FOR AUXILIARY BATTERY CONSERVATION IN ADAPTERS

BACKGROUND OF THE INVENTION

1. Field of the Invention

The present invention relates to conservation of auxiliary battery power in adapters. More particularly, it relates to an apparatus and method for conserving auxiliary battery power in a wireless device that is connected to a host device.

2. Description of the Prior Art

Wireless devices enable computers to communicate with other computer devices without requiring physical access to a land line communication port. One type of wireless device is a wireless modem which is similar to a wired modem in that it permits a computer or other device to send and receive data from external sources. A wireless modem may be installed as an adapter card or in an adapter slot such as a Personal Computer Memory Card International Association PCMCIA slot. A wireless modem typically consists of two major portions: a radio portion and a baseband portion.

The radio portion consists of a transmitter and a receiver. The transmitter and receiver may share a common antenna via a duplexer. The transmitter is responsible for generating RF signals using a baseband signal to modulate a carrier signal. The receiver is responsible for producing a baseband signal from RF signals by demodulating an RF signal received at the antenna to produce a demodulated baseband signal. The radio provides physical access to a network or connection (i.e., the wireless network). An antenna is used for transmitting and receiving the electromagnetic communications signals from the air interface.

The baseband portion provides a baseband signal to the transmitter and accepts baseband signals from the radio receiver. The baseband portion decodes the baseband signals to provide data (i.e., receiving data) and encodes data to provide a baseband signal for transmission by the transmitter (i.e., sending data).

As is typical of wireless modems, a portion of the wireless modem fits into a PCMCIA adapter slot. The adapter may consist of an integrated package or several separate components that can be attached via appropriate cabling. The radio portion of the wireless adapter contains the transmitter, receiver and associated circuitry to provide for RF communications. The ability of the radio to transmit at certain ranges is limited by the transmit power it can radiate via the antenna. The radio transmitter can require substantial amounts of current (as much as 1 amp) to operate. Most wireless systems require that the transmitter radiate power at levels up to 3 watts. The transmitted power levels in some wireless systems are controlled by the base station transmitter. The radiated power level can thus require that approximately 1 amp of current be supplied to the radio transmitter of the wireless modem when the wireless modem is radiating at higher power levels. Typically transmit power levels for Advanced Mobile Phone Service (AMPS) cellular and Cellular Digital Packet Data (CDPD) transmissions are 600 mW. For Advanced Radio Data Information Service (ARDIS), transmission levels of 1 W are typical.

The PCMCIA architecture can typically only supply a PCMCIA slot with a ½ amp (500 mA) of current. This limitation is due to the nature of the PCMCIA interface and the PCMCIA standard itself. Therefore, with wireless adapters the PCMCIA bus of the host computer can supply less than half the required current when the radio transmitter is operating at higher power levels. In order to provide the required power, prior art systems have supplemented the power supplied to the radio with an auxiliary battery or batteries. These prior art systems have directly coupled the auxiliary power source to the transmit amplifier.

Use of the auxiliary battery creates several problems, especially for laptops or mobile computing devices. First, the auxiliary battery is inconvenient for mobile computer users to carry (i.e., 4AA NiCAD batteries). This inconvenience is caused by the bulk and weight of the auxiliary battery. The bulk of the auxiliary battery also makes the mobile device unwieldy to place and utilize. Secondly, the auxiliary battery needs to be periodically recharged. Auxiliary battery re-charging, in addition to any host battery recharging, is an inconvenience for user. The wireless adapter's recharging unit may be incompatible with the recharging system for the laptop thus forcing the user to carry two different recharging mechanisms: one for the mobile unit's battery and one for the adapter's auxiliary battery. Thirdly, prior art systems directly coupled the auxiliary battery to the transmitter's power amplifier. This caused the wireless adapter to be inoperable under any operating conditions when the auxiliary battery needed recharging. Thus, there is an unsatisfied need in the prior art to reduce the size of the auxiliary battery and/or increase the time periods between recharging. There is also a need to permit wireless adapters to operate in certain circumstances with a dead or defective auxiliary battery.

These unresolved problems and deficiencies are clearly felt in the art and are solved by the invention in the manner described below.

SUMMARY OF THE INVENTION

The above-mentioned needs have been met in accordance with the present invention by providing for an apparatus that satisfies these needs. Accordingly, it is an object of the present invention to provide an adapter that uses a smaller auxiliary battery.

It is an object of the invention to provide power to the adapter solely from a host computer when the host computer can supply the power requirements of the adapter.

It is another object of the invention to provide for operating the adapter in a low power mode when the auxiliary power source is unavailable or unable to supply power.

It is an object of the invention to supplement the power provided to the adapter by a host computer with an auxiliary battery only when the host computer cannot supply the required power to the wireless adapter.

It is another object of the invention to provide a lightweight wireless adapter.

It is a further object of the invention to provide a wireless adapter that has a sleek slimline appearance.

It is yet another object of the invention to provide a wireless adapter that is very portable.

It is still a further object of the invention to reduce the need for recharging the auxiliary battery.

It is still a yet another feature of the invention to conserve auxiliary battery power.

Accordingly, an adapter card for use in a host device is provided, the adapter having an auxiliary power interface for receiving power from an auxiliary source; a host power interface for receiving host power signals; a power bus for distributing power on the adapter card, the power bus coupled to the host power interface; a switch for electrically coupling the host power interface or the auxiliary power interface to a variable power component; and, a controller for causing the switch to supply the variable power component with power from the auxiliary power interface when the power required by the variable power component exceeds a threshold, else causing the switch to supply the variable power component with received host power signals.

Also provided is a method of conserving auxiliary batter power in an adapter, the method having the steps of: determining a transmit power level and an associated power required by a power amplifier to yield a desired transmit power level; comparing the associated power required by the power amplifier with available power from a host interface; and supplying the power amplifier with power from an auxiliary source if the available power from a host interface is insufficient to meet the associated power required by the power amplifier.

An adapter card for use in a host device, the adapter card having an auxiliary power interface for receiving power from an auxiliary source; a host power interface for receiving host power signals; a power bus for distributing power on the adapter card, the power bus coupled to the host power interface; and a power augmentation device for electrically coupling the host power interface to a variable power component and for augmenting power supplied to the variable power component from the host power interface with power supplied from the auxiliary power interface; and, a controller for causing the power augmentation device to augment power supplied to the variable power component with power from the auxiliary power interface when the power required by the variable power component exceeds the power that can be allocated to the variable power component from the host power interface.

A method of conserving auxiliary battery power is provided having the following steps: determining a transmit power level and an associated power required by a power amplifier to yield a desired transmit power level; comparing the associated power required by the power amplifier with available power from a host power interface; and supplementing the power amplifier with power from an auxiliary source if the available power from the host power interface is insufficient to meet the associated power required by the power amplifier.

BRIEF DESCRIPTION OF THE DRAWINGS

The foregoing and other objects, aspects and advantages of the invention will be better understood from the following detailed description with reference to the drawings, in which.

DETAILED DESCRIPTION

Although the present invention will be described with respect to a wireless radio adapter it is applicable to any adapter which supplements power from a host device with an auxiliary battery during normal operations. The present invention receives power from at least two sources: a host device and an auxiliary power source. The host device may be a laptop computer, such as an IBM Thinkpad computer, having one or more PCMCIA slots. For the purposes of this specification, "Host Device" is a generic term used to describe a machine, which is usually a computer or terminal or lap top or palm top or hand held or personal digital assistant or other device. The host device provides slots for accepting adapter cards. In the preferred embodiment these adapter cards and slots conform to Personal Computer Memory Card International Association (PCMCIA) standards.

The present invention will be described with respect to a constant or near constant voltage level, which for PCMCIA systems is +5 volts. Using the assumption of constant or near constant voltage level, power which is typically measured in watts can be represented by the current (amps) that a particular device or component is drawing. Therefore, current can be used to represent power. For instance, the PCMCIA slot can deliver 500 milliamps of current. This can be used to represent power or compute power in watts (2500 mwatts=500 milliamps*5 Volts). The present invention is in no way limited to constant or near constant voltage systems.

Figure 1:
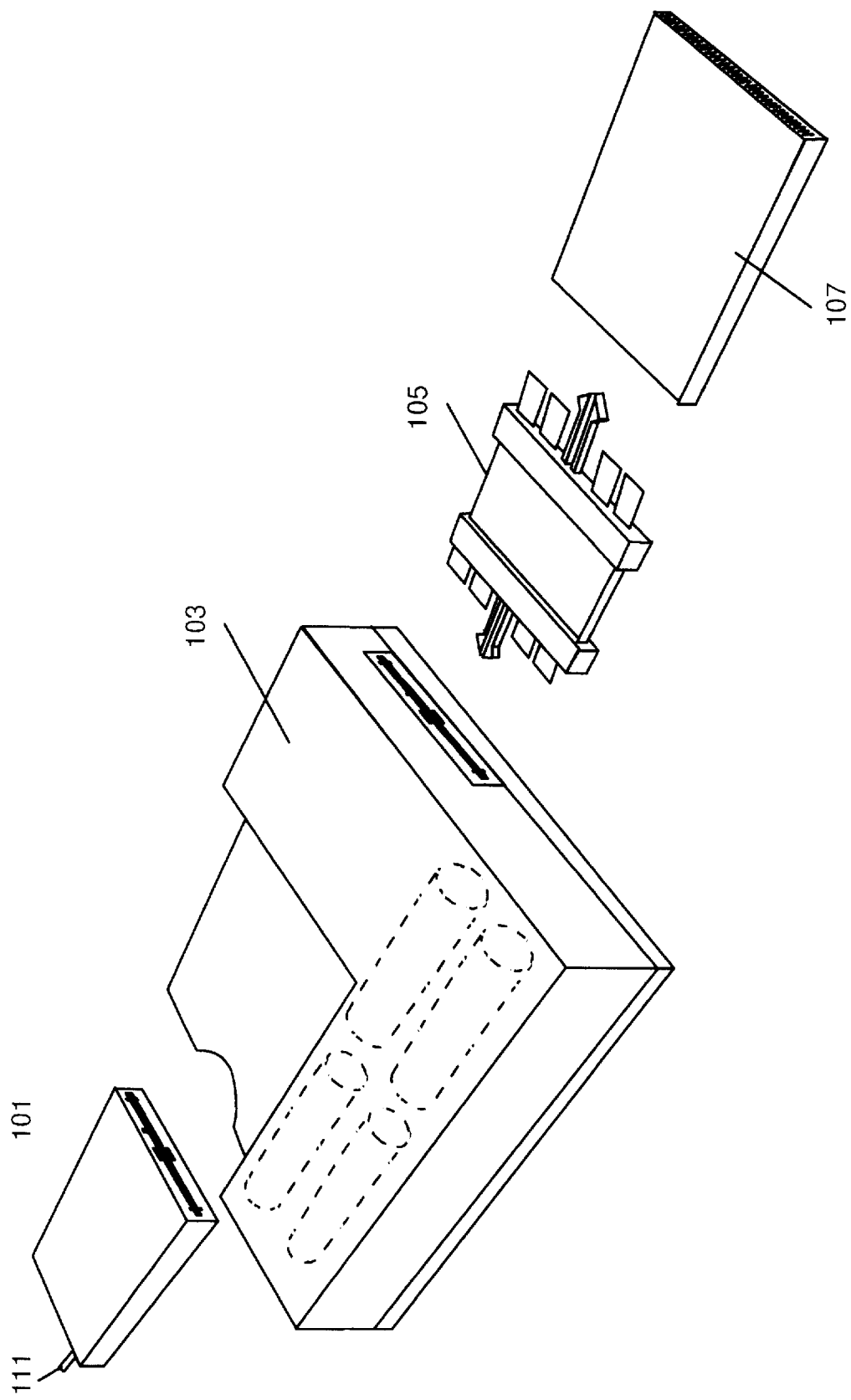
FIG. 1 is an overview of one embodiment of a wireless modem adapter.

One embodiment of the present invention is shown in FIG. 1. As shown the wireless modem consists of a PCMCIA adapter card 107 containing the baseband portion of the modem, a cable 105 for connecting the PCMCIA card to the radio module 101. The radio module 101 is shown with antenna 111. Note that the radio module can be mounted on the host device such as the back of the display or integrated into the host device. The radio module 101 is supplied power from the PCMCIA card via cable 105 and the auxiliary batteries contained within the housing 103. A 22 pin ITT connector is used to connect the base band portion to the radio portion, although any suitable cable or electrical coupling may be utilized. The PCMCIA card 107 contains a 68 pin PCMCIA standard connector that enables the card to be inserted into any PCMCIA adapter slot.

In an alternative embodiment the baseband adapter card and radio module can be integrated into a single card that can be inserted into a PCMCIA slot. The single integrated card may have a section that protrudes externally from the PCMCIA slot when the integrated card is inserted into the slot. In the embodiment shown in FIG. 1, cable 105 carries signals between the radio module 101 and the baseband card 107. These signals provide the radio module 101 with power, control information, baseband signals for transmission and provides the baseband portion with status information and received baseband signals.

Figure 2:
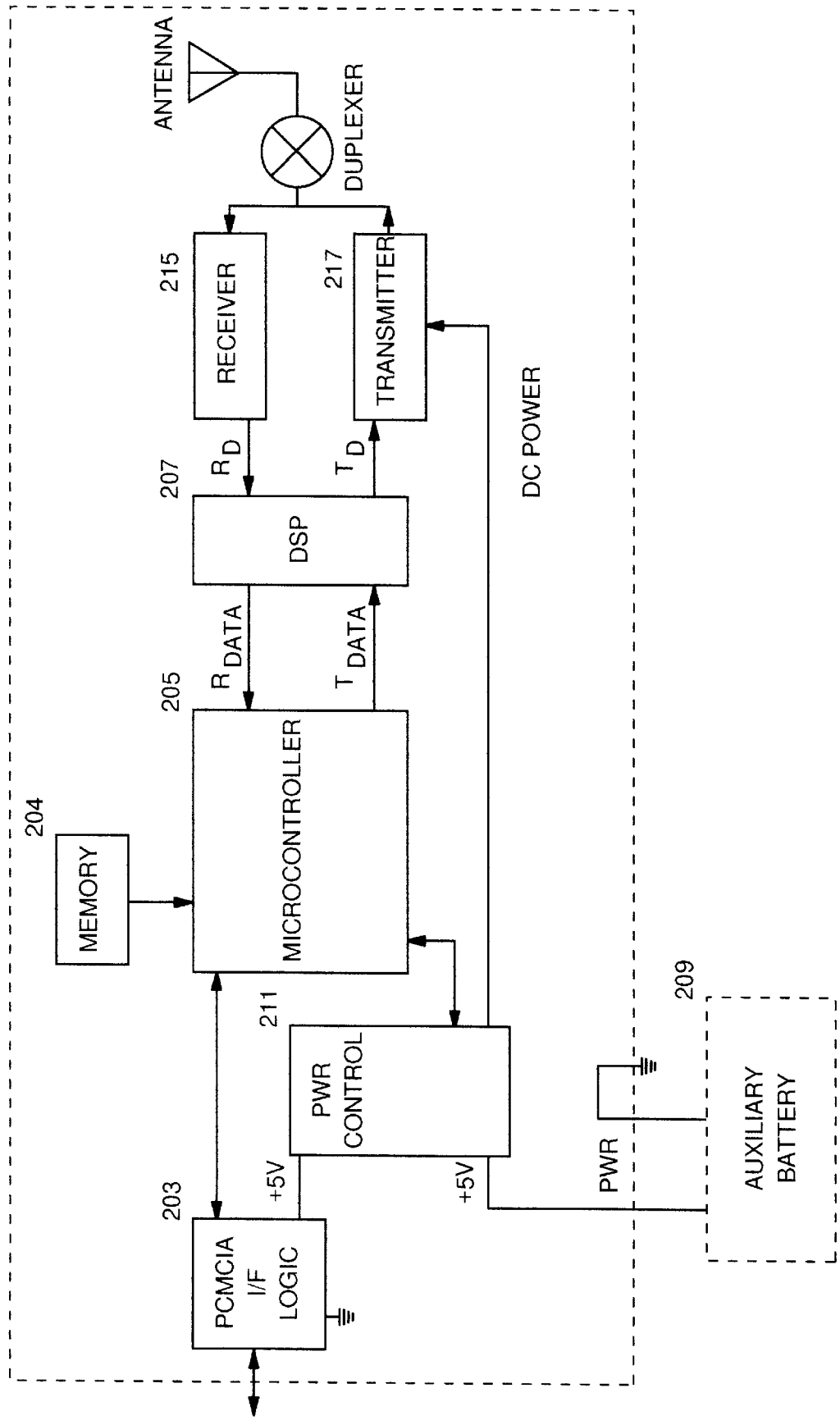
FIG. 2 depicts a functional block diagram of a wireless modem adapter according to the present invention.

FIG. 2 depicts a functional block diagram of a wireless modem adapter according to the present invention. The wireless modem adapter interfaces with the host device via the standard 68 pin PCMCIA connector and PCMCIA interface logic 203. The PCMCIA architecture permits information to be written and read from the wireless modem adapter card. The PCMCIA interface is described in detail in the PCMCIA Specification (i.e., Personal Computer Memory Card International Association—PCMCIA Standard Release 2.1) which is hereby incorporated by reference. The PCMCIA interface logic 203 may be combined with micro-controller 205 which may also be combined with DSP 207 into a single integrated circuit package. The adapter card looks to the PCMCIA bus as an I/O card type. The adapter card receives DC power from the PCMCIA interface and an auxiliary battery 209. The auxiliary battery 209 may be mounted on the wireless modem adapter or may be external to the wireless modem adapter and coupled by a cable or other suitable connection or may be detachably mounted to the adapter card. DC power is distributed throughout the adapter using standard DC power distribution lines and techniques.

In the preferred embodiment a DC variable power controller 211 can select one of two or more sources to provide variable power components with DC power. For instance, power consumption of the transmitter 217 (more specifically the transmit power amplifier) varies with the desired transmit power level. The transmitter can be supplied with DC power from the host device or the auxiliary source or both. The micro-controller can signal or instruct the DC variable power controller 211 to provide the variable power component(s) with power from one of the power sources. This can be accomplished, for instance, by writing to a register or memory location assigned to the DC variable power controller 211. The DC variable power controller 211 can select the source of DC power (i.e., the host device or the auxiliary battery) or may combine the two power sources to provide necessary power to the transmit power amplifier.

In the preferred embodiment the power received from the host device is distributed to all components of the wireless adapter with exception of one or more of the variable power consumption components such as the transmit power amplifier. Other components that have variable power characteristics may also be supplied power from the DC variable power controller on separate lines or share the same lines. Power management with multiple power components could provide none, one, or all of the variable power components with auxiliary power as power demand changed. The variable power components are supplied power via the DC variable power controller.

In a wireless modem, the component that has the potential to draw the most current and use the most power is the transmitter, specifically the transmit power amplifier. In most wireless systems the transmitted power of each adapter can be controlled by the base station. Transmitter power control by the base station allows the base station to better control the energy transmitted in the operating portion of the RF spectrum. Thus, when the wireless adapter is close to the base station's antenna, the adapter's transmit power can be lower than when the wireless adapter is operating in a fringe area or farther away from the base station. When the adapter's transmit power output is reduced, the current required by the RF power amplifier is reduced, often dramatically. As is often the case, for certain periods of time the power required by the wireless adapter is less than the maximum power that the host device can supply. For instance, a PCMCIA slot can supply 500 ma of current. The wireless adapter can take advantage of these time periods to conserve its auxiliary batteries by switching the auxiliary batteries off-line.

The present invention makes use of the variable power consumption requirements of the wireless radio transmitter. When the transmitter requirements are such that the host device can supply the wireless adapter with all necessary power then the micro-controller 205 instructs or causes the DC variable power controller 211 to provide the transmitter with power solely from the host device. When the transmitter requires more power than the host device can supply, the micro-controller 205 instructs or causes the DC variable power controller 211 to supply the transmitter with power from the auxiliary source.

One embodiment of the DC variable power controller 211 is a single pole, double throw switch that is located between the auxiliary battery and the transmit power amplifier, so that the power amplifier can be powered alternatively by either the auxiliary battery or the host device through the PCMCIA interface. The switch is controlled by either a hardware or software threshold mechanism responding to a signal or determination that sets the transmit power output of the wireless adapter's transmitter. When the total expected power consumption for the wireless adapter exceeds the threshold then the auxiliary power is used to supply the transmitter's power amplifier else the host device supplies the power amp. The threshold may be computed in watts or amps. After determining the desired transmit power level, the current draw for the power amplifier can be determined based on known characteristics of the power amplifier. An algorithm or table may used to provide transmitter current draw versus output power level. The threshold is based on the maximum power/current that the host device can supply. When the adapter is transmitting at a power level that can be completely supplied by the host device, the host device supplies the power to the entire wireless adapter including the variable power components. If the host device can supply 500 ma, of which 300 ma is used to power components other then the power amplifier, then 200 ma is available for the power amplifier. Thus, whenever the transmit power level requires the power amplifier to draw less or equal to 200 ma the auxiliary battery is not needed. Assuming an amplifier having a 50% efficiency rating operating at 5 volts, a PCMCIA slot can supply a transmit level up to 500 mw (200ma*5v*0.50). If the host device cannot supply all necessary power then the auxiliary battery is used to supply or supplement the power supplied to the transmit power amplifier. The relatively few periods of time that the host device cannot supply the transmit power amplifier with the required power it is supplied by the auxiliary battery, greatly reducing the draw on the auxiliary battery.

Figure 3:
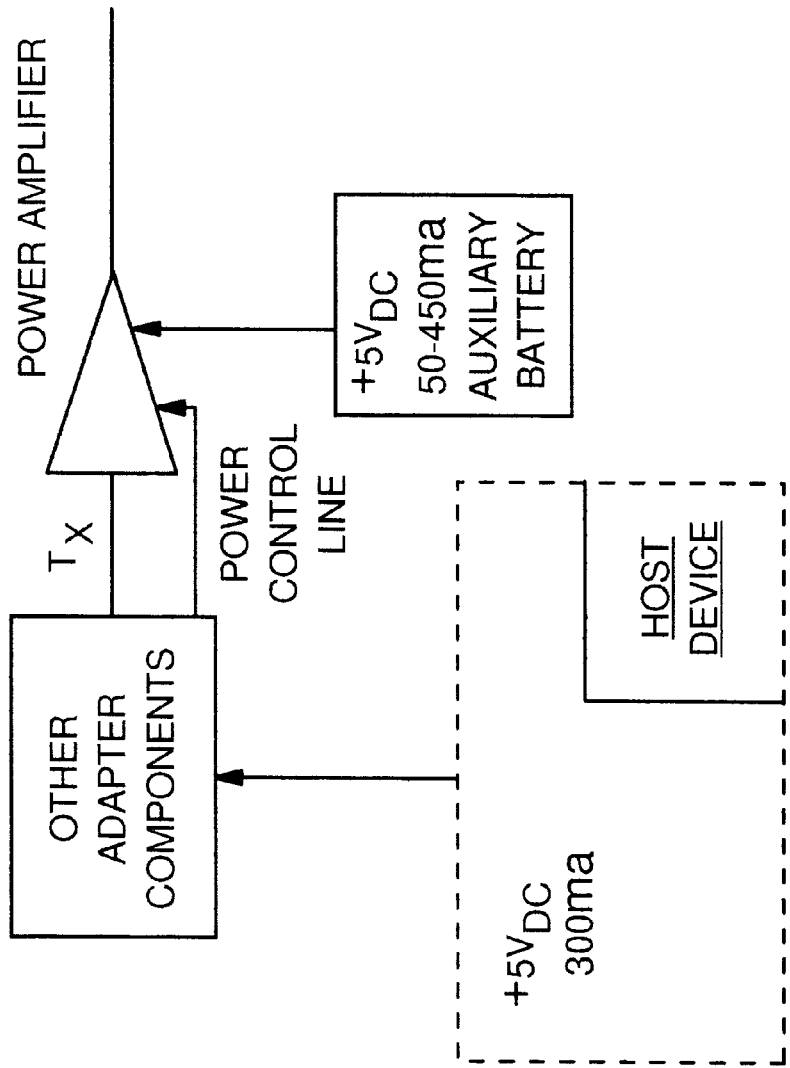
FIG. 3 depicts auxiliary battery use in a prior art configuration.

The auxiliary power savings of the present invention can be illustrated using an example. FIG. 3 illustrates a depiction of a prior art system for supplying DC power to a prior art wireless adapter. The wireless adapter components, other than the transmit power amplifier typically draw about 300 ma of current which is supplied by the PCMCIA adapter port. The auxiliary batteries are directly coupled to the power amplifier and supply between 50 ma–450 ma of current. Note that the power amplifier is always drawing some current from the auxiliary batteries when the wireless adapter is powered up. Assuming operating characteristics as described in table I,

TABLE I

| Time Usage (%) | Transmit Power Level | Auxiliary Battery Supplied Amps |
| --- | --- | --- |
| 15% | 600 mw | 450 ma |
| 70% | 250 mw | 200 ma |
| 15% | 100 mw | 100 ma | the hourly time average current draw from the auxiliary battery is as follows:

Time Average ma=0.15*450+0.70*200+0.15*100=222.5 ma.

Therefore, a 1 hour transmit interval requires a battery with a 223 ma per hour capacity.

Figure 4:
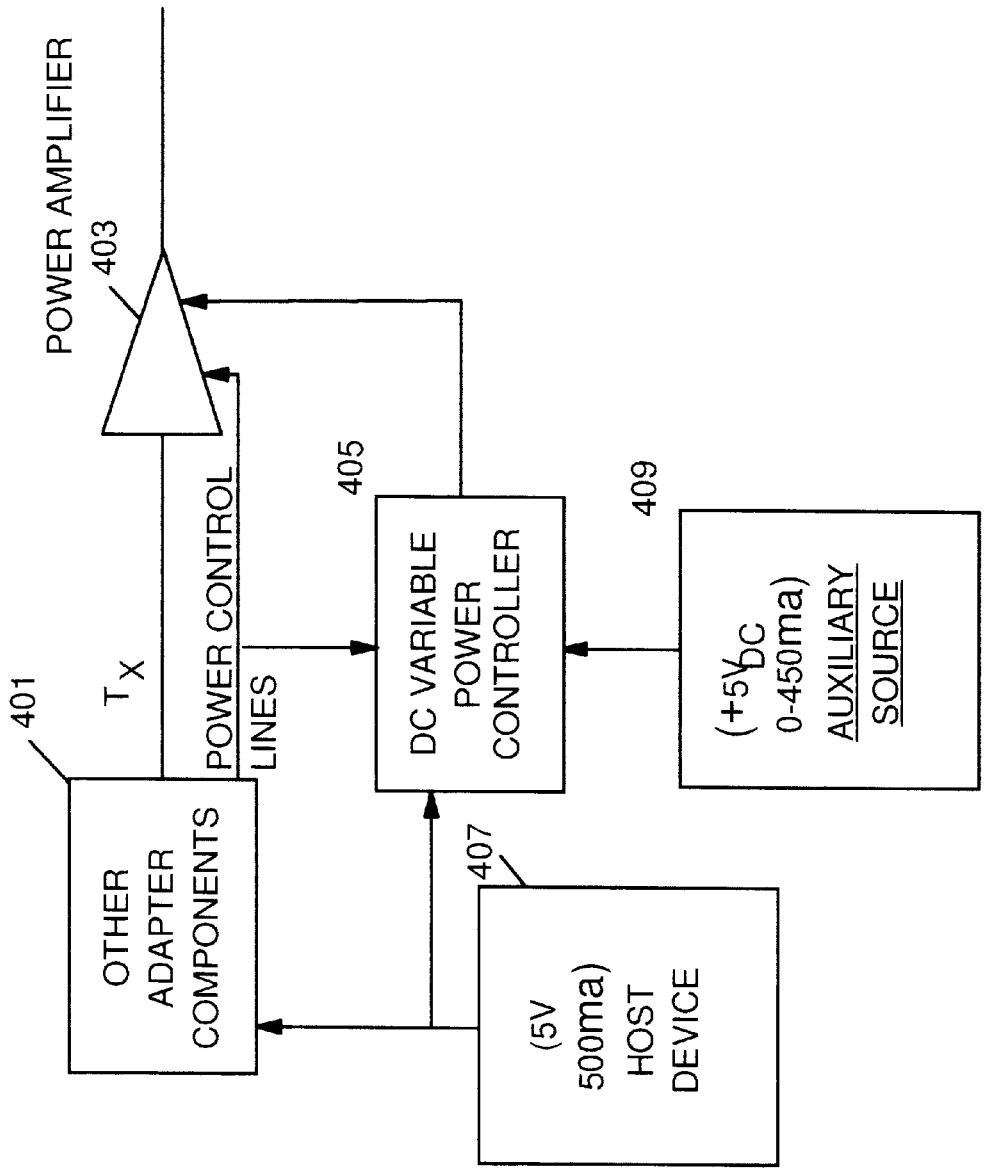
FIG. 4 depicts DC power management in accordance with the present invention.

FIG. 4 illustrates the present invention wherein the DC variable power controller 405 is programmed or instructed to supply DC power to the transmit power amplifier when the transmit power level is greater than 250 mw and to use power from the host device when the transmit power is 250 mw or less. Adapter components, other than the transmit power amplifier typically draw about 300 ma of current which is supplied by the PCMCIA adapter slot. The auxiliary batteries supply 450 ma of current to the transmit power amplifier only when the output power level is 600 mw. Note that the power amplifier is not drawing any current from the auxiliary batteries when the transmit power levels are at the 250 mw and 100 mw levels. This situation is illustrated

TABLE II

| Time Usage (%) | Transmit Power Level | Auxiliary Battery Supplied Amps |
| --- | --- | --- |
| 15% | 600 mw | 450 ma |
| 70% | 250 mw | 0 ma |
| 15% | 100 mw | 0 ma | in Table II where the hourly time average current draw from the auxiliary battery is as follows:

Time Average ma=0.15*450+0.70*0+0.15*0=67.5 ma. Therefore, a 1 hour transmit interval requires a battery with only a 68 ma per hour capacity.

As the above example demonstrates, the present invention permits the use of a smaller auxiliary battery or a greater time between re-charging or a combination of both. Also the present invention still permits the adapter to operate in low power mode when the auxiliary battery is unavailable. By reducing the auxiliary power consumed by the adapter card, a longer lasting power supply or smaller sized power supply can be utilized. Also with the present invention, the wireless adapter card can still function in low power mode when the auxiliary battery is dead or needs recharging or is in the process of recharging.

Figure 5:
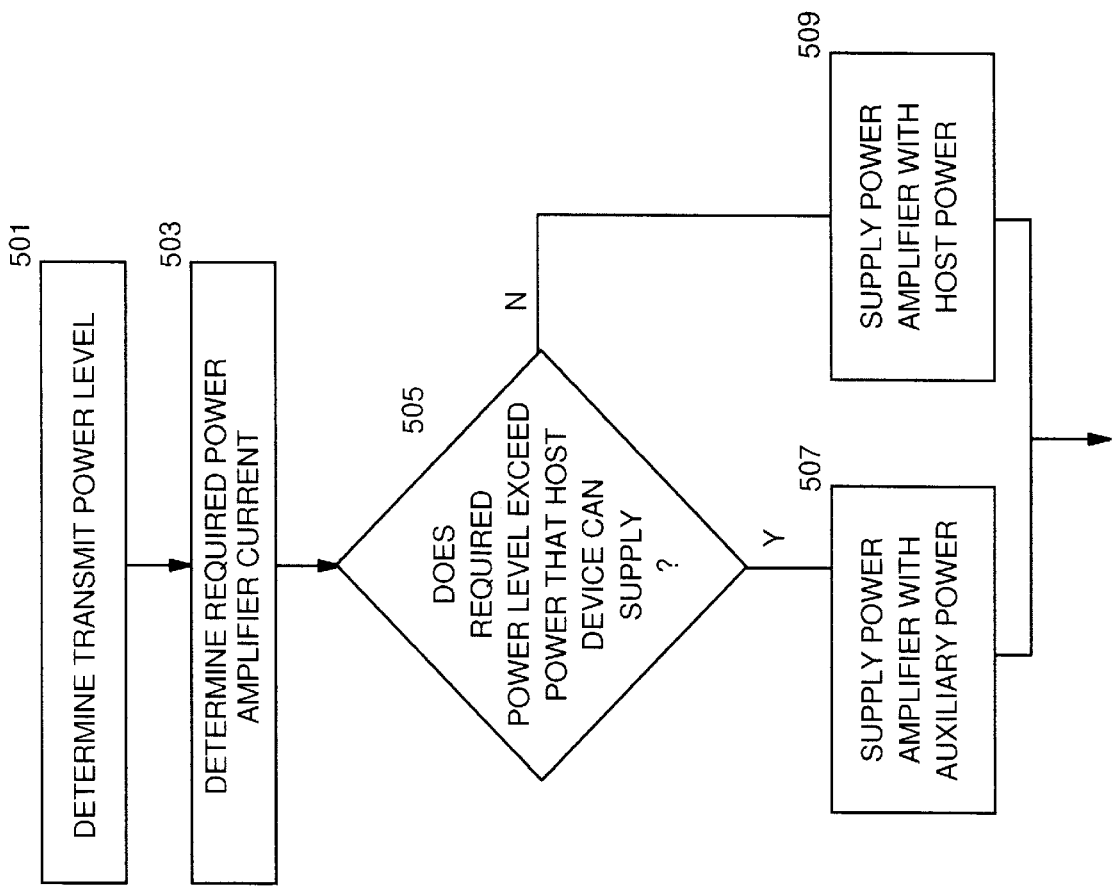
FIG. 5 depicts a method of suppling power to the transmitter power amplifier in accordance with the present invention.

FIG. 5 depicts the method of the present invention. In step 501, the adapter determines the required transmit power level. In the preferred embodiment this is accomplished by the micro-controller carrying out an appropriate software routine. The required transmit power level may be received from the base station in a message or it may be calculated by the micro-controller using a protocol or it may be read from storage or some other means. Even though some wireless systems fix the transmit power level, most wireless modems can support various wireless systems so that although auxiliary power cannot be conserved for all wireless systems, the present invention can conserve power with respect to some. From the required transmit power level, and known characteristics of the power amplifier and wireless adapter card the required current for the power amplifier can be calculated. Alternatively a table can used to relate transmit power level to the controller state. This is shown as step 503. In step 505 a check is made to determine whether the required current level for the power amplifier exceeds the power level that host device can supply. For example, if the adapter card is a PCMCIA adapter card and requires 300 ma of current, excluding the power amplifier then if the power amplifier requires a current of 200 ma or less the PCMCIA host device can supply the current necessary to power the amplifier without the auxiliary battery as shown in step 509. If the power amplifier requires more than 200 ma then the auxiliary power source is needed to supply the requested power as shown in step 507.

An alternative embodiment of a wireless modem adapter can use a wireless telephone to provide for the RF functions. The baseband portion may also be included or integrated into the phone. The PCMCIA card would thus supply power and data in and data out signals to the baseband function within the phone. The cable connector at the phone and the signal mapping would depend on the particular type of cellular phone that was utilized. The DC variable power controller could be located within the phone along with the auxiliary batteries.

Figure 6:
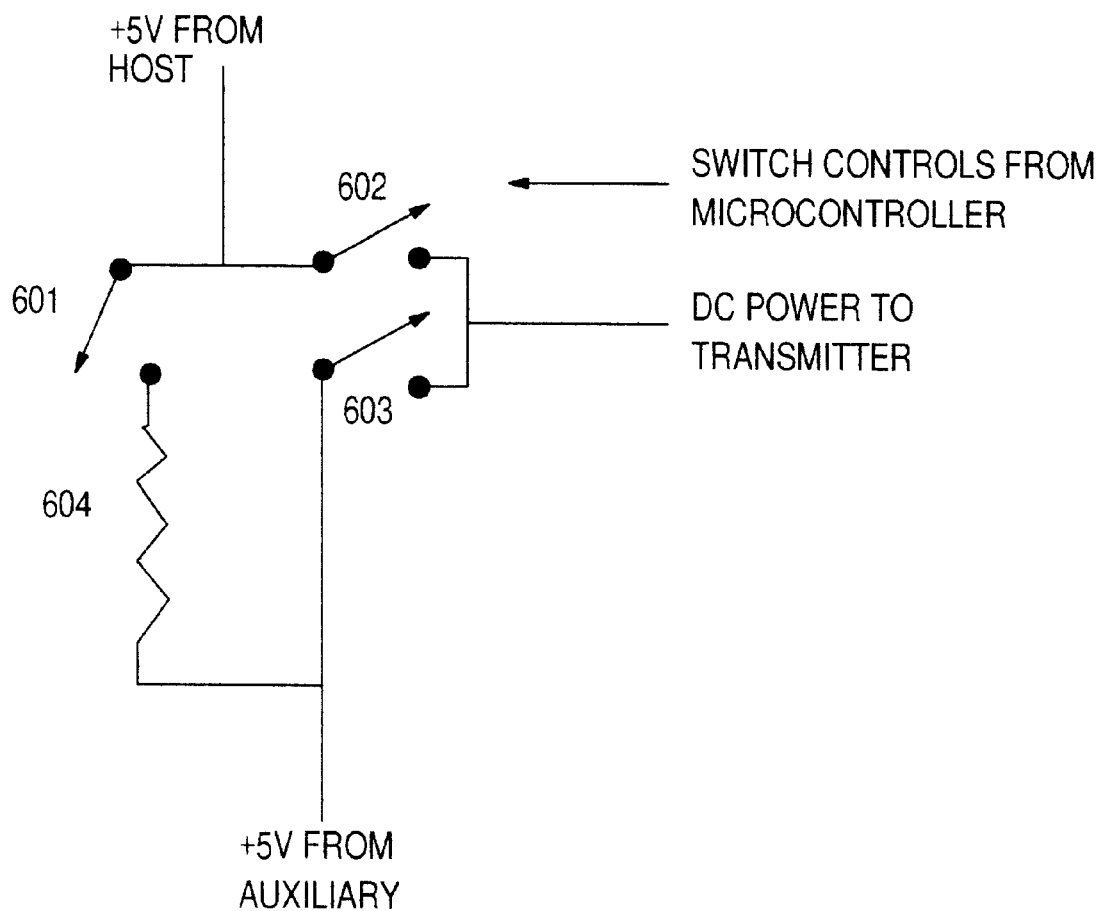
FIG. 6 depicts a switch version of the power control module.

In an alternative embodiment an additional circuit can be added to control the charging of the auxiliary battery. Whether being charged from the host device or an external charger, a switch is placed between the charger and the auxiliary battery. This switch is controlled by the transmit signal, such that it is open while transmitting and closed when not transmitting. This permits the host supply to be utilized while not exceeding its current limits. In this embodiment, the power controller 211 is implemented as several discrete switches each of which is controlled by microprocessor 205. This is shown in FIG. 6. When the microprocessor recognizes that the transmitter power level called for is less than a ceratin value, it sends a discrete control signal to close switch 602 and open switches 603 and 601. Alternatively, when the microprocessor recognizes that the transmitter power level called for is at or above the certain value, it sends a discrete control signal to open switch 602 and close switch 603. Switch 601 remains open in either case. When the microprocessor determines that the auxiliary battery 209 needs to be charged, usually by measuring voltage, it sends discrete control signals open switches 602 and 603, and close 601. Current can then flow from the Host battery to the auxiliary battery and thereby recharge it. The resistor 604 has an appropriate value to set the required charging circuit.

Figure 7:
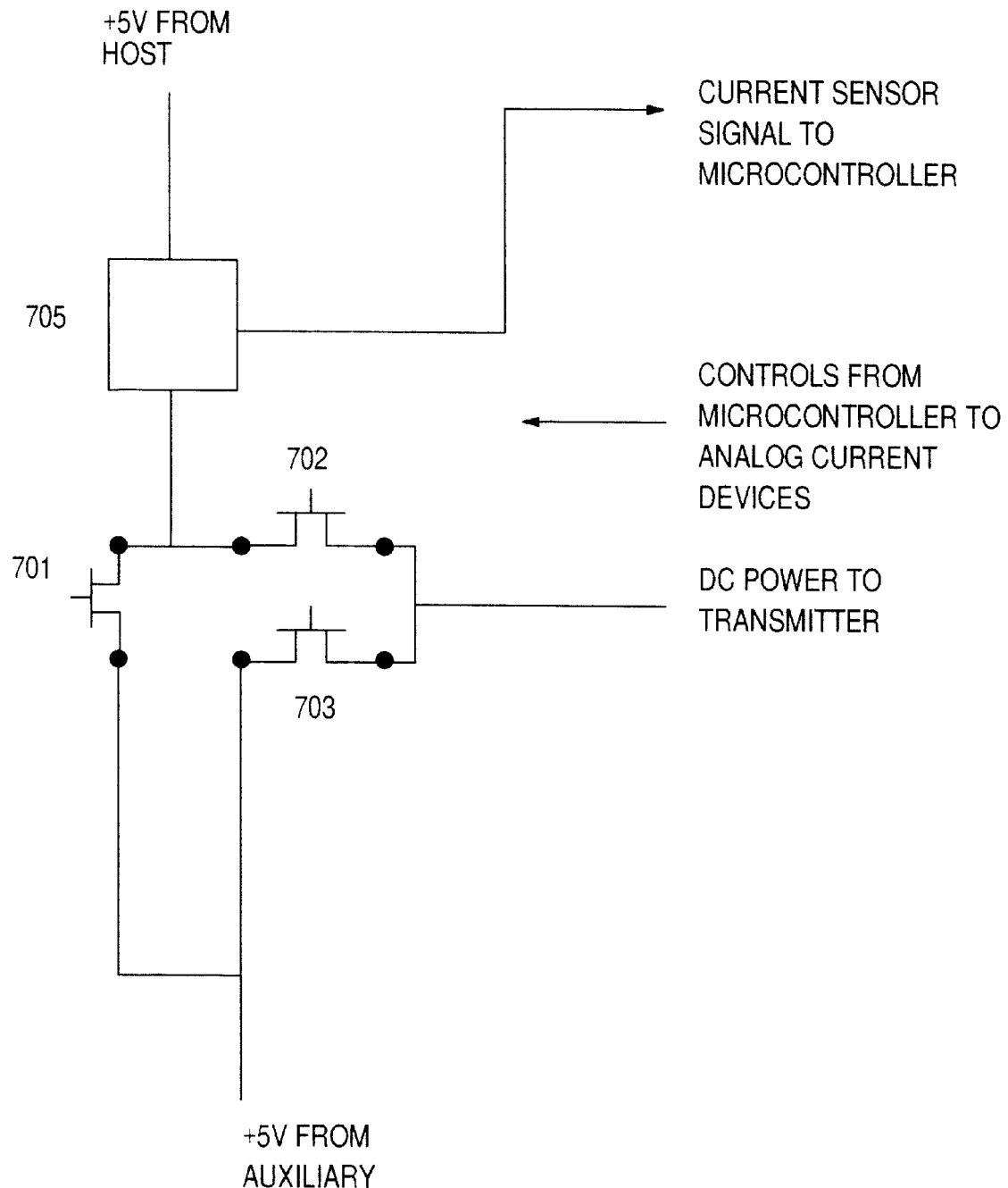
FIG. 7 depicts a variable current version of the power control module.

Another alternative embodiment of the power controller 211 is shown in FIG. 7. The switches of FIG. 6 have been replaced by devices whose conductance can be controlled by discrete signals from the microprocessor. This can be accomplished using digital to analog converters that present the required analog signal to the gate of a MOSFET device. In FIG. 7 current sensor 705 sends a signal to the microprocessor which informs the microprocessor about how much current is being drawn from the host battery by the transmitter. In this way, the microprocessor can control the conductances of devices 702 and 703 such that a maximum amount of current is supplied by the host battery and only when that host capacity is going to be exceeded that additional current is supplied to the transmitter from the auxiliary battery. When recharging the auxiliary battery, devices 702 and 703 are opened and the microprocessor sends the control to 701 necessary to cause the required charging current to go from the Host to the auxiliary battery.

The preferred embodiment of the present invention contains one or more software systems or software components or functions. In this context, a software system is a collection of one or more executable software programs, and one or more storage areas (for example, RAM, ROM, cache, disk, flash memory, PCMCIA, CD-ROM, Server's Memory, ftp accessible memory, etc.) In general terms, a software system should be understood to comprise a fully functional software embodiment of a function or collection of functions, which can be added to an existing processing system to provide new function to that processing system. Software systems generally are constructed in a layered fashion. In a layered system, a lowest level software system is usually the operating system which enables the hardware to execute software instructions.

A software system is thus understood to be a software implementation of a function which can be carried out in a processor system providing new functionality. Also, in general, the interface provided by one software system to another software system is well-defined. It should be understood in the context of the present invention that delineations between software systems are representative of the preferred implementation. However, the present invention may be implemented using any combination or separation of software or hardware systems.

The software systems may be distributed on a computer usable medium such as floppy disk, diskettes, CD-ROM, PCMCIA cards, flash memory cards and/or any other computer usable medium. Note that the software system may also be downloaded to a processor via a communications network or from an Internet node accessible via a communications adapter.

While the invention has been described in detail herein in accord with certain preferred embodiments thereof, modifications and changes therein may be effected by those skilled in the art. Accordingly, it is intended by the appended claims to cover all such modifications and changes as fall within the true spirit and scope of the invention.

What is claimed:

1. An adapter for use in a host device, the adapter comprising:

an auxiliary power interface for receiving power from an auxiliary source;

a host power interface for receiving host power signals;

a power bus for distributing power on the adapter, the power bus coupled to the host power interface;

a switch coupled to the power bus for electrically coupling the host power interface or the auxiliary power interface to a variable power component; and a controller for causing the switch to supply the variable power component with power from the auxiliary power interface when the power required by the variable power component exceeds a threshold, else causing the switch to supply the variable power component with power from the host power interface, wherein the variable power component is a power amplifier, wherein the adapter is a wireless adapter comprising a receiver and a transmitter, the transmitter comprising the power amplifier.

2. A method of conserving auxiliary battery power in an adapter, the method comprising the following steps:

determining a transmit power level and an associated power required by a power amplifier to yield a desired transmit power level;

comparing the associated power required by the power amplifier with available power from a host interface;

supplying the power amplifier solely with the power from the host interface when the available power from the host interface is sufficient to meet the associated power required by the power amplifier; and supplying the power amplifier with power from an auxiliary source if the available power from a host interface is insufficient to meet the associated power required by the power amplifier.

3. An article of manufacture a program product comprising a processor useable medium having a processor readable program embodied in said medium, wherein the processor readable program when executed on a processor causes the processor to:

determine a transmit power level and an associated power required by a power amplifier to yield a transmit power level;

compare the associated power required by the power amplifier with available power from a host interface;

supply the power amplifier solely with the power from the host interface when the available power from the host interface is sufficient to meet the associated power required by the power amplifier; and supply the power amplifier with power from an auxiliary source if the available power from the host interface is insufficient to meet the associated power required by the power amplifier.

4. An adapter for use in a host device, the adapter comprising:

an auxiliary power interface for receiving power from an auxiliary source;

a host power interface for receiving host power signals;

a power bus for distributing power on the adapter, the power bus coupled to the host power interface;

a power augmentation device coupled to the power bus for electrically coupling the host power interface to a variable power component and for augmenting power supplied to the variable power component from the host power interface with power supplied from the auxiliary power interface; and a controller for causing the power augmentation device to power the variable power components solely from power from the host power interface when the power required by the variable power component does not exceed the power that can be allocated to the variable power component from the host power interface, wherein the controller causes the power augmentation device to augment the power supplied to variable power component from the host power interface with power from the auxiliary power interface when the power required by the variable power component exceeds the power that can be allocated to the variable power component from the host power interface.

5. The adapter of claim 4 wherein:

the variable power component is a power amplifier.

6. The adapter of claim 5 wherein the adapter is a wireless adapter having a receiver and a transmitter, the transmitter having the power amplifier.

7. A method of conserving auxiliary battery power in an adapter, the method comprising the following steps:

determining a transmit power level and an associated power required by a power amplifier to yield a desired transmit power level;

comparing the associated power required by the power amplifier with available power from a host power interface;

supplying the power amplifier solely with power from the host power interface if the available power from the host power interface is sufficient to meet the associated power required by the power amplifier; and supplementing the power supplied from the host power interface to the power amplifier with power from an auxiliary source if the available power from the host power interface is insufficient to meet the associated power required by the power amplifier.

8. An article of manufacture a program product comprising a processor useable medium having a processor readable program embodied in said medium, wherein the processor readable program when executed on a processor causes the processor to:

determine a transmit power level and an associated power required by a power amplifier to yield a desired transmit power level;

compare the associated power required by the power amplifier with available power from a host power interface;

supply the power amplifier solely with power from the host power interface if the available power from the host power interface is sufficient to meet the associated power required by the power amplifier; and supplementing the power supplied from the host power interface to the power amplifier with power from an auxiliary source if the available power from the host power interface is insufficient to meet the associated power required by the power amplifier.

9. An adapter for use in a host device, the adapter comprising:

an auxiliary power interface for receiving power from an auxiliary source;

a host power interface for receiving host power signals;

a power bus for distributing power on the adapter, the power bus coupled to the host power interface;

a first switch coupled to the power bus for electrically coupling the host power interface to a variable power component;

a second switch coupled to the power bus for electrically coupling the auxiliary power interface to the variable power component; and a controller for causing the first switch to supply the variable power component solely with power from the host power interface, and for causing the second switch to additionally supply the variable power component with power from the auxiliary power interface when the power required by the variable power component exceeds a threshold.

10. The adapter of claim 9 further comprising:

a third switch electrically coupling the host power interface to the auxiliary power interface wherein the controller causes the third switch to supply the auxiliary power interface with power from the host power interface when unallocated power from the host interface is available.

11. The adapter of claim 10 wherein:

the variable power component is a power amplifier.

12. The adapter of claim 11 wherein the adapter is a wireless adapter having a receiver and a transmitter, the transmitter having the power amplifier.

13. An adapter for use in a host device, the adapter comprising:

an auxiliary power interface for receiving power from an auxiliary source;

a host power interface for receiving host power signals;

a power bus for distributing power on the adapter, the power bus coupled to the host power interface;

a first variable conductance device coupled to the power bus for electrically coupling the host power interface to a variable power component;

a second variable conductance device coupled to the power bus for electrically coupling the auxiliary power interface to the variable power component;

a current sensor for determining the amount of current drawn from the host power interface by the variable power component;

a controller coupled to the current sensor for setting the conductances of the first and second variable conductance devices to supply the variable power component with power from the host power interface when the host power interface can be operated at equal to or less than maximum capacity, else setting the conductances of the first and second variable conductance devices to supply the variable power component with power from the auxiliary power interface; and a third variable conductance device electrically coupling the host power interface to the auxiliary interface when the controller causes the third variable conductance device to supply the auxiliary power interface with power from the host interface when excess power from the host interface is available, wherein the variable component is a power amplifier wherein the adapter is a wireless adapter comprising a receiver and a transmitter, the transmitter comprising the power amplifier.

14. The adapter of claim 13, wherein the adapter is a wireless modem operable for transmitting and receiving information while connected to the host device.

* * * * *